(12) United States Patent
Shim et al.

(10) Patent No.: US 6,270,665 B1
(45) Date of Patent: Aug. 7, 2001

(54) AERATION TANK OF ORGANIC WASTE LIQUOR AND AERATION APPARATUS USING THE TANK

(76) Inventors: Jae-Do Shim, Shiei-Jutaku 216-5, 2, Kita 3-chome, Gekuen-Kibanadai, Miyazaki-shi, Miyazaki 889-2152 (JP); Yoshiichi Okada, 25-10, Kibogaoka 3-chome, Miyazaki-shi, Miyazaki 880-0923 (JP)

( * ) Notice: Subject to any disclaimer, the term of this patent is extended or adjusted under 35 U.S.C. 154(b) by 0 days.

(21) Appl. No.: 09/297,106
(22) PCT Filed: Oct. 22, 1997
(86) PCT No.: PCT/JP97/03835
§ 371 Date: Jun. 2, 1999
§ 102(e) Date: Jun. 2, 1999
(87) PCT Pub. No.: WO98/17583
PCT Pub. Date: Apr. 30, 1998

(30) Foreign Application Priority Data

Oct. 24, 1996 (JP) .................................................. 8-320670

(51) Int. Cl.$^7$ ................................. C02F 1/24; C02F 3/02; C02F 3/22
(52) U.S. Cl. ..................... 210/221.2; 210/194; 210/195; 210/201; 210/202; 210/205
(58) Field of Search .................................. 210/221.2, 194, 210/195, 201, 202, 205

(56) References Cited

U.S. PATENT DOCUMENTS

| | | | |
|---|---|---|---|
| 3,719,278 | * | 3/1973 | Kolfertz . |
| 4,295,946 | * | 10/1981 | Nazarian et al. . |
| 4,321,125 | * | 3/1982 | Nazarian et al. . |
| 4,349,430 | * | 9/1982 | Efimov et al. . |
| 4,349,431 | * | 9/1982 | Axenko et al. . |
| 4,572,786 | * | 2/1986 | Endo . |
| 4,834,872 | * | 5/1989 | Overath . |
| 5,562,821 | * | 10/1996 | Gutierrez-Collazo . |
| 5,665,227 | * | 9/1997 | Watt . |

FOREIGN PATENT DOCUMENTS

| | | |
|---|---|---|
| 4-7028 | 1/1992 | (JP) . |
| 971484 | * 11/1982 | (SU) . |

* cited by examiner

Primary Examiner—Thomas M. Lithgow
(74) Attorney, Agent, or Firm—Sheridan Ross P.C.

(57) ABSTRACT

Disclosed is an aeration apparatus for the efficient purification of livestock excretory liquid at low cost and in a way that prevents environmental pollution. The organic waste fluid aeration tank consists of an outer tank (1) and an aeration tube (2) installed within the outer tank. This aeration tube (2) has suction holes (3) set in the lower tube wall and scatter holes (4) set in the upper tube wall. An air diffusion head (6) coupled to a blast pipe (5) is built into the base of the tube. The liquid being treated is decomposed biologically within the outer tank (1), and is aerated within the aeration tube (2). It is expelled into a sludge sedimentation tank. A portion of the attached organic substances and generated bubbles is scattered back into the outer tank (1) through the scatter holes (4). In this invention, multiple units of the above-mentioned tanks are employed in series. Purified water is obtained through the purification of supernatant liquid delivered to the sludge sedimentation tank from the first aeration tank by aeration in the remaining tank. The purified water may be used as wash water for pig houses and liquefied fertilizer.

10 Claims, 2 Drawing Sheets

AERATION TANK OF ORGANIC WASTE LIQUOR AND AERATION APPARATUS USING THE TANK

This application claims priority under 35 U.S.C. § 365(c) from PCT Application No. PCT/JP97/03835, filed on Oct. 22, 1997, and under 35 U.S.C. § 119 from Japanese Patent Application No. 8-320670 filed on Oct. 24, 1996. These prior applications are incorporated by reference herein in their entirety.

FIELD OF THE INVENTION

This invention is related to organic waste fluid aeration tanks and aeration apparatuses, with special regard to the liquid waste, excreta, etc., of livestock.

BACKGROUND OF THE INVENTION

Environmental pollution due to livestock excreta has become an increasingly large problem in recent years. In the past, various activated sludge apparatuses for organic waste fluid processing, including livestock wastes, have been proposed. The high cost of activated sludge apparatuses, however, makes it difficult for livestock raisers to employ them. Further, the handling of reactors used in the treatment process, the nutrition source/microorganism loading ratio, and selection of the mean residence time within the tank are difficult. The most difficult problem is an interference with sludge sedimentation due to increases of fibrous microorganisms. The maintenance of dissolved oxygen levels in the aeration tanks, the regulation of the cycling volume of activated sludge and the control of waste activated sludge are difficult. Fine bubbles are thought to be better in promoting the conveyance efficiency of oxygen. The distinction between fine and coarse is, however, ambiguous, making appropriate control impossible. Further, not only is the treatment time from the introduction of raw liquid to discharge lengthy; it also takes an inordinate amount of time to produce a non-offensive smelling and biochemically stable quality nutritious source. The establishment of an economical and structurally simple excretory liquid treatment system for livestock is still some time off; therefore, a dependence upon such primitive methods as natural decomposition using trench holes or aeration continues to be necessary.

Natural decomposition utilizing trench holes, however, causes ground water contamination, and forced aeration utilizing concrete frames requires an extended period of time to purify excretory liquid to effluent quality, making it an inefficient method due to the lengthy digestive time required by microorganisms.

The present invention alleviates the above mentioned problems by being non-polluting and by providing inexpensive organic liquid through an efficient purification system.

SUMMARY OF THE INVENTION

The aeration tank of this invention returns a portion of adhered organic substances and bubbles to its outer tank after treatment in its aeration tube. The aeration tube is installed within the outer tank. Suction holes are set at the base of the aeration tube wall and scatter holes are positioned at the upper end of the tube wall. An air diffusion head, coupled to a blast pipe, is inserted into the base of the tube. A further tube, designed to carry away bubbles expelled upward from the aeration tube, is fitted to the top end of the tube. The organic waste fluid aeration apparatus employed in the above mentioned aeration tank constitutes a quick and continuous automatic system for the removal of solid organic substances suspended in waste fluid.

The system functions in the following manner: At least two of the above mentioned aeration tanks are utilized in tandem or series. One unit functions as the collected bubble mixture aeration tank. Liquid to be treated is received into the outer tank from the raw liquid adjusted tank. It is then received into the aeration tube where it is aerated by a mixture of collecting bubbles. The generated bubbles are then expelled into a sludge sedimentation tank. The second unit receives supernatant liquid from the sludge sedimentation tank directly into its aeration tube via an initial return tube. Subsequent units receive liquid directly into their aeration tubes from the outer tank of the aeration tanks directly preceding the receiving units. A portion of the organic substances attached to bubbles generated by each aeration tube is scattered back into its respective outer tank and a portion is conducted to the collected bubble mixture tank. The overflow from the final aeration tank is collected in the treated liquid reservoir tank.

If only one aeration treatment unit is employed in conjunction with a collected bubble mixture tank, liquid expelled into the outer tank is delivered directly into the treated liquid reservoir tank. When two units are employed, expelled liquid is delivered into the treated liquid reservoir tank only from the outer tank of the second aeration tank. The more aeration tanks utilized, the more the waste fluid is purified. From an economic perspective, however, the optimum number of units is from two to four. Three units should provide an acceptable level of purity.

DETAILED DESCRIPTION

Figure 1:
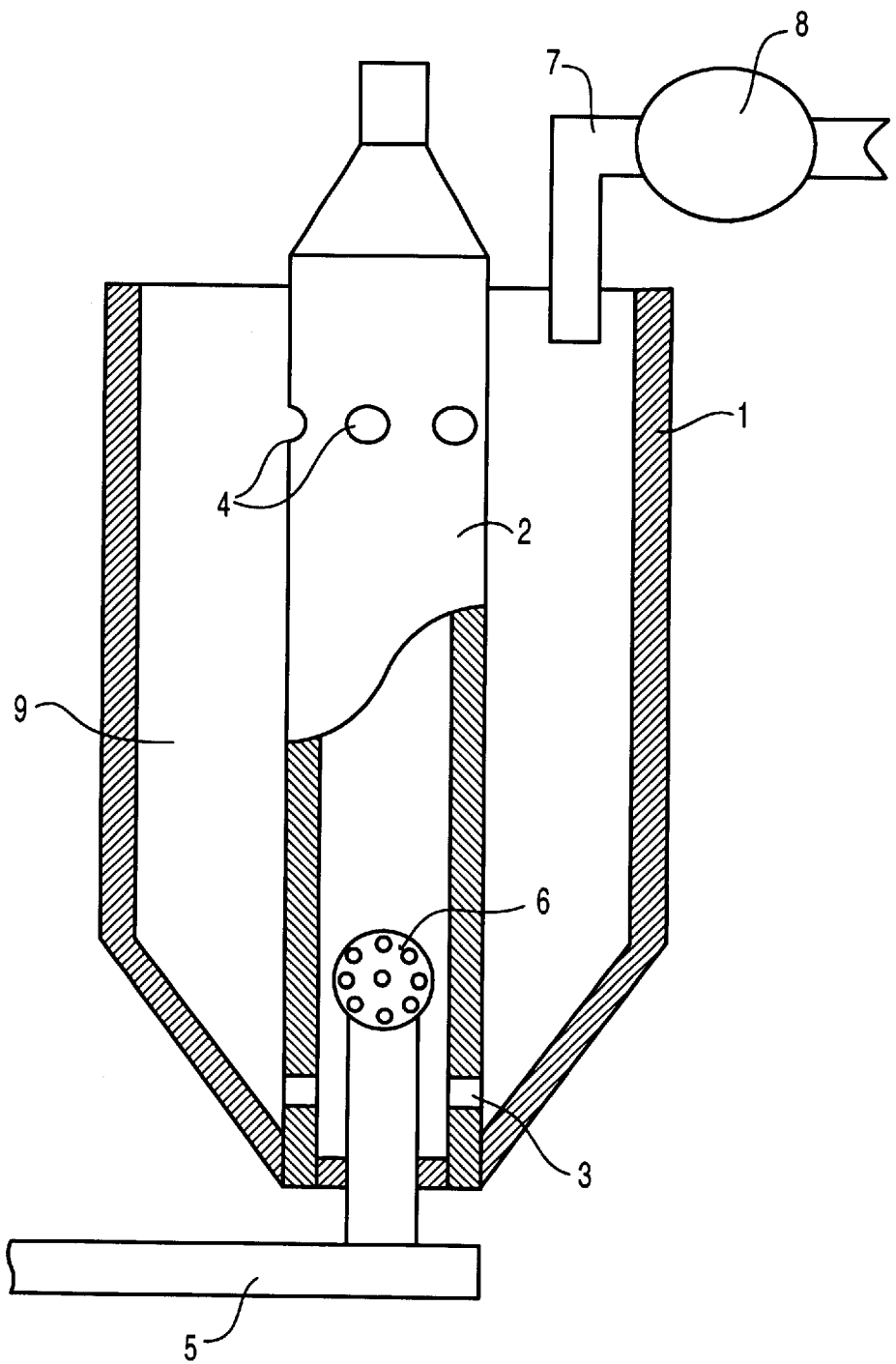
FIG. 1 is a partially cutaway side view of one embodiment of the organic waste fluid aeration tank of the invention.

FIG. 1 shows an example of the aeration tank or unit of the invention. The outer tank (1) is a cone shaped anti-corrosion tank with its apex at the bottom. The lower end is closed at the center of the outer tank (1). The aeration tube (2) is installed within the outer tank and is connected at its upper end opening port to a transfer tube. Anti-corrosion vinyl pipes are used in the aeration tube (2). The liquid being treated (9) is received into the aeration tube (2) from the outer tank (1) through multiple suction holes (3) set at the base of the aeration tube (2) wall. Multiple scatter holes (4) are positioned at the upper end of the aeration tube (2).

In this invention, concentrated aeration is performed in the aeration tube (2), and solid substances are removed automatically by generated bubbles to which they adhere. A portion of the bubbles generated by aeration are cycled into the outer tank (1) through the scatter holes (4), and the remaining bubbles are expelled to the sludge sedimentation tank (described later) via pipes fitted to the upper end opening port. Biological decomposition is effected in the outer tank (1) by the reproductive activity of oxygenated microorganisms. The aeration tube (2) contains a built-in air diffusion head (6) coupled to a blast pipe (5) positioned at the base of the tube. The diffusion head (6) aerates and froths the liquid being treated in the outer tube (1) as it is introduced into the aeration tube (2). Liquid being treated is pumped (8) into the outer tank (1) via a raw liquid supply tube (7). The liquid being treated (9) can be, for example waste fluid and livestock excretory liquid containing pre-adjusted organic substances.

Figure 2:
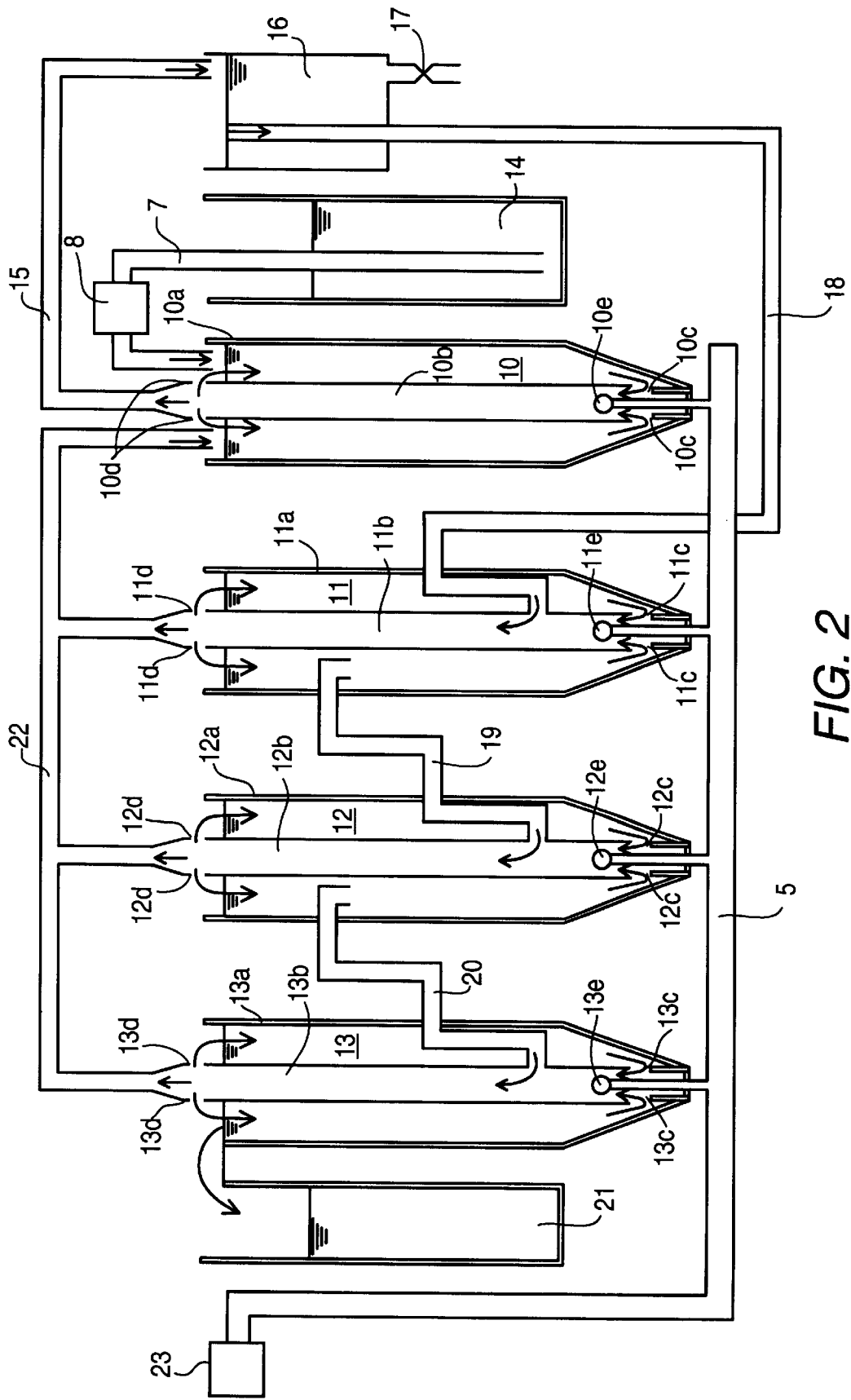
FIG. 2 is a diagrammatic illustration showing the organic waste fluid treatment apparatus employing multiple aeration tanks shown in FIG. 1.

FIG. 2 shows the organic waste fluid aeration apparatus with four of the aeration units described in FIG. 1 installed in series. The first of the four units serves as the collected bubble mixture aeration tank (10). The remaining three tanks serve as pure liquid aeration tanks and consist of the first aeration tank (11), the secondary aeration tank (12), and the tertiary aeration tank (13). The outer tank (10a) of the collected bubble mixture aeration tank (10) is connected to the raw liquid adjusted tank (14) via the raw liquid supply tube (7). Number eight (8) is a pump. The adjusted raw liquid is supplied to the upper part of the outer tank (10a) through the raw liquid supply tube (7). The upper end of the aeration tube is connected to the sludge sedimentation tank (16) via the secondary bubble transfer tube. Bubbles generated in the aeration tube (10b) are expelled to the sludge sedimentation tank (16) via the bubble transfer tube (15). Number seventeen (17) is a sludge pullout valve.

The first aeration tank (11), the secondary aeration tank (12), and the tertiary aeration tank (13) are connected in series in the direction of flow of the liquid being treated. The first aeration tank (11) is connected to the sludge sedimentation tank (16) via the first return tube (18). The first return tube (18) is connected at one end to the supernatant section of the sludge sedimentation tank (16). The other end is connected to the aeration tube (11b) of the first aeration tank (11). The aeration tube (12a) of the secondary aeration tank (12) is connected to the outer tank (11a) of the first aeration tank (11) via the secondary return tube (19). The aeration tube (13b) of the tertiary aeration tank (13) is connected to the outer tank (12a) of the secondary aeration tube (12) via the tertiary return tube (20) in the same manner. The overflow liquid from the outer tank (13a) of the tertiary aeration tank (13) is introduced into the treated water reservoir tank (21). Each aeration tube (11b, 12b, and 13b) in the series of aeration tanks (11, 12, 13) contains suction holes (11c, 12c, and 13c) at its base, and scatter holes (11d, 12d, and 13d) at its upper end. The scatter holes are connected to the outer tank (10a) of the collected bubble mixture tank (10) via the secondary bubble transfer tube (22). Air diffusion heads (10e, 11e, 12e, and 13e) which are connected to a blast pipe (5) are built-in to the base of each aeration tube (10b, 11b, 12b, 13b) of all four aeration tanks (10, 11, 12, 13). Number twenty-three (23) is a blower connected to the blast pipe (5).

The organic waste fluid aeration apparatus shown in FIG. 2 functions as follows to purify livestock as well as other organic waste fluid. The excreta mixture from pig houses, feed dropping substances, etc., for example, are cleansed with water and deposited into a catchment tank (not indicated in drawing). The organic waste is then treated by a solid liquid separator (not indicated in drawing) where bulky refuse, sediment, etc. are removed. It is then introduced into a raw liquid tank (not indicated in drawing) through a cushion tank (not indicated in drawing) via waste fluid tubes. It is desirable to incubate and produce heterotrophic bacteria aerobically after adding microorganisms into the raw liquid tank; however, good results are obtainable without adding microorganisms.

Important microorganisms employed in waste fluid treatment are common bacillus sp (Bacillus. sp), lactic acid bacillus, lactic acid coccus, Gram-negative bacillus, obligate aerobe, yeast, mold, etc.

The waste fluid pumped up from the raw liquid tank is loaded from the upper section of the outer tank (10a) into the collected bubble mixture aeration tank (10) through the raw liquid supply tube (7) by the pump (8), maintaining an aerobic condition in the raw liquid adjusted tank (14). The waste fluid is decomposed biologically by microorganisms within the outer tank (10a) of the collected bubble aeration tank (10). The biologically decomposed waste fluid is introduced via the suction holes (10c) into the aeration tube (10b) through the action of the air diffusion head (10e). It is then aerated. Aeration causes the organic waste to adhere to the bubble surface. These bubbles are expelled into the sludge sedimentation tank via the secondary bubble transfer tube (15) from the upper end of the aeration tube (10b). During this process, a portion of the bubbles is scattered back into the outer tank (10a) from the scatter hole (10d) of the aeration tube (10b). The organic sludge froth discharged with the bubbles settles in the sludge sedimentation tank. The sludge is removed via the sludge pullout valve (17), and is transferred to the sludge thickener (not indicated in drawing) as necessary by the airlift pump (not indicated in drawing). The thickened sludge is utilized as water adjusted materials in a compost shed.

The supernatant liquid in the sludge sedimentation tank (16) is further purified, as above, in the first aeration tank (11), the secondary tank (12) and the tertiary aeration tank (13). The supernatant liquid in the sludge sedimentation tank (16) may be supplied to the aeration tube (11b) of the first aeration tank (11) via the first return tube (18). The bubbles aerated in the aeration tube (11b) are circulated into the outer tank (10a) of the collected bubble tank (10) via the first bubble transfer tube (22). A portion of the bubbles is scattered back to the outer tank (11a) from the scatter hole (11d) of the aeration tube (11b) where it is biologically decomposed in the outer tank (11a). This portion is then recycled through the aeration tube (11b) from the suction hole (11c) to the aeration tube (11b). A portion is supplied to the aeration tube (12b) of the secondary aeration tank (12) via the secondary return tube (19); and, as above, it is supplied to the aeration tube (13b) of the tertiary aeration tank (13) via the tertiary return tube (20) from the outer tank (12a) of the secondary aeration tank (12). It is then cycled through in the same manner as it is in the first aeration tank (11), and is re-introduced into the outer tank (10a) of the collected bubble mixture aeration tank (10) through the first bubble transfer tube (22). The purified liquid overflow from the outer tank (13a) of the tertiary aeration tank (13) accumulates in the treated liquid reservoir tank (21). The purified liquid in the treated liquid reservoir tank is available for use as cleaning water. Its high fertilizer response component content, however, renders it useful as a highly liquefied fertilizer.

The above-mentioned aeration treatment will achieve the following results: an approximately 100% removal rate of *Escherichia coli;* a 100% removal rate of ammonia gas; a 99% removal rate of biochemical oxygen demand (BOD); a 99% removal rate of floating suspended matter (SS); a 99% removal rate of turbidity (TU); a 99% removal rate of ammonia nitrogen; a 92% removal rate of total ammonia (T-N); a 71% removal rate of chemical oxygen demand (COD), and an 82% removal rate of total organic carbon (TOC).

The high purification performance and purification effects achieved by this organic waste fluid aeration tank and aeration apparatus are due to the production of high density bubbles by concentrated aeration and the continuous expulsion of organic substances adhered to these bubbles.

Oxygen suitable for the reproduction of microorganisms, which are treated biologically in the outer tank, can always be supplied.

Various reactors can be utilized for the treatment process, allowing a wide range of options. Because no secondary sedimentation tank is required, costs for construction, operation and maintenance of such a tank are spared. The process also removes the need to select a microorganism/nutrient ratio loading reference and mean a residence time; prevents the growth of fibrous microorganisms; allows easy maintenance of dissolved oxygen and regulation of the flux volume and control of activated sludge; prevents problems with the occurrence of bulky sludge, floating or nocardia bubbles; and allows a short treatment time. In particular, the process allows the easy and economical treatment of swine excretory liquid.

INDUSTRIAL APPLICABILITY

The organic waste fluid aeration tank and aeration treatment system of this invention are suitable not only for the treatment of ordinary waste fluid, such as from food processing factories, but also for the treatment of livestock wastes, which have a high BOD load and a high viscosity. Particularly, due to low cost performance, an approximate 100% removal of ammonia gas and the resultant absence of *Escherichia coli,* it has the advantage of being usable as washing water and as liquefied fertilizer.

What is claimed is:

1. An aeration tank for organic waste fluid comprising:
   an outer tank;
   an aeration tube vertically installed within said outer tank;
   suction holes in a lower portion of said aeration tube for fluid communication with said outer tank;
   scatter holes in an upper portion of said aeration tube for fluid communication with said outer tank;
   a gas-diffusion head in said lower portion of said aeration tube, wherein said gas-diffusion head is adapted for connection to a gas source and wherein gas diffused through said gas diffusion head into said organic waste fluid creates bubbles;
   a bubble transfer tube fluidly connected to the upper portion of said aeration tube for removal of bubbles and organic substances adhered thereto.

2. An aeration apparatus for organic waste fluid comprising:
   multiple aeration tanks according to claim 1 connected in series;
   an untreated organic waste fluid reservoir;
   a sludge sedimentation tank having a supernatant discharge port;
   a treated liquid reservoir tank; and wherein:
   (1) said outer tank of a first aeration tank in said series is fluidly connected to said untreated organic waste fluid reservoir;
   (2) said bubble transfer tube of said first aeration tank is fluidly connected to said sludge sedimentation tank;
   (3) said aeration tube of said first aeration tank is fluidly connected to said supernatant discharge port of said sludge sedimentation tank;
   (4) said aeration tube of a second aeration tank in a series is fluidly connected to said outer tank of said first aeration tank;
   (5) said bubble transfer tubes of aeration tanks subsequent to said first aeration tank are fluidly connected to said outer tank of said first aeration tank for collecting of bubbles and organic substances adhered thereto;
   (6) the outer tank of a final aeration tank is fluidly connected to the treated liquid reservoir tank.

3. A device for aerating organic waste fluid, comprising:
   an outer tank;
   an aeration tube having upper and lower portions disposed within said outer tank;
   at least one suction hole located in a periphery of said lower portion of said aeration tube;
   at least one scatter hole located in a periphery of said upper portion of said aeration tube;
   a gas-diffusion head located in an interior of said aeration tube;
   a gas source communicating with said gas-diffusion head at a second end; and
   a bubble transfer tube interconnected to said aeration tube at an upper end of said aeration tube.

4. The device for aerating organic waste fluid of claim 3, wherein said gas source conducts air to said gas-diffusion head.

5. The device for aerating organic waste fluid of claim 3, wherein a first end of said bubble transfer tube communicates with said upper end of said aeration tube, and a second end communicates with a sludge sedimentation tank.

6. The device for aerating organic waste fluid of claim 3, wherein said aeration tube is vinyl.

7. The device for aerating organic waste fluid of claim 3, wherein said gas-diffusion head comprises a porous stone.

8. A device for aerating organic waste fluid, comprising:
   at least two aeration units, said aeration units comprising:
   an outer tank;
   an aeration tube having upper and lower portions disposed within said outer tank;
   at least one suction hole located in a periphery of said lower portion of said aeration tube;
   at least one scatter hole located in a periphery of said upper portion of said aeration tube;
   an air-diffusion head located in an interior of said aeration tube; and
   a gas source communicating with said air-diffusion head;
   a raw liquid supply tube operatively connected to said outer tank of a first of said aeration units;
   a bubble transfer tube communicating at a first end with an upper end of said aeration tube of said first aeration unit, and communicating at a second end with a sludge sedimentation tank;
   a first return tube communicating at a first end with said aeration tube of a second of said aeration units, and communicating at a second end with said sludge sedimentation tank; and
   a treated water reservoir tank communicating with said outer tank of said second aeration unit.

9. The device for aerating organic waste fluid of claim 8, further comprising:
   more than two aeration units;
   a second return tube communicating at a first end with said outer tank of said second aeration unit, and communicating at a second end with said aeration tube of a third of said aeration units; wherein said treated water reservoir tank communicates with said outer tank of said third aeration unit.

10. The device for aerating organic waste fluid of claim 8, wherein said second end of said first return tube is disposed in an upper half of said sludge sedimentation tank.

* * * * *